United States Patent
Kim

(10) Patent No.: US 7,240,962 B2
(45) Date of Patent: Jul. 10, 2007

(54) HEATING APPARATUS FOR AUTOMOBILE SEATS

(75) Inventor: Hyo Seok Kim, Hwaseong-si (KR)

(73) Assignee: Hyundai Motor Company, Seoul (KR)

( * ) Notice: Subject to any disclaimer, the term of this patent is extended or adjusted under 35 U.S.C. 154(b) by 438 days.

(21) Appl. No.: 10/911,707

(22) Filed: Aug. 4, 2004

(65) Prior Publication Data

US 2005/0099043 A1  May 12, 2005

(30) Foreign Application Priority Data

Nov. 5, 2003 (KR) .................. 10-2003-0077816

(51) Int. Cl.
*A47C 7/72* (2006.01)
(52) U.S. Cl. ................. 297/180.12; 297/217.3
(58) Field of Classification Search ............ 297/217.3, 297/180.12, 217.1, 180.1; 180/53.8; 280/1; 219/202, 217
See application file for complete search history.

(56) References Cited

U.S. PATENT DOCUMENTS

| | | | |
|---|---|---|---|
| 6,179,378 B1 * | 1/2001 | Baumgartner et al. | 297/180.12 |
| 6,710,303 B1 * | 3/2004 | Lorenzen | 219/217 |
| 6,914,217 B2 * | 7/2005 | Fristedt | 219/217 |
| 7,021,707 B2 * | 4/2006 | Young et al. | 297/217.2 |
| 2004/0036325 A1 * | 2/2004 | Diemer et al. | 297/180.12 |
| 2005/0040682 A1 * | 2/2005 | Ulbrich | 297/180.12 |

FOREIGN PATENT DOCUMENTS

| | | |
|---|---|---|
| JP | 07-155240 | 6/1995 |
| JP | 09-211151 | 8/1997 |
| JP | 2000-210159 | 8/2000 |

* cited by examiner

*Primary Examiner*—Milton Nelson, Jr.
(74) *Attorney, Agent, or Firm*—Morgan Lewis & Bockius LLP

(57) ABSTRACT

A heating apparatus for automobile seats is disclosed. In particular, a heating wire is installed in the interiors of a seat. A piezoelectric element is installed between an automobile engine and each engine mount. The heating wire is energized by the power generated by each piezoelectric element when an engine vibrates. The seat is heated based on a heating operation of the heating wire.

6 Claims, 4 Drawing Sheets

HEATING APPARATUS FOR AUTOMOBILE SEATS

CROSS-REFERENCE TO RELATED APPLICATIONS

This application claims priority of Korean application no. 10-2003-0077816, filed Nov. 5, 2003, the disclosure of which is incorporated herein by reference.

FIELD OF THE INVENTION

The present invention relates to a heating apparatus for automobile seats, and in particular to a heating apparatus for automobile seats using the self-generated power of a piezoelectric element. The invention provides heating wires installed in the seats, and a piezoelectric element installed between an automobile engine and each engine mount. The heating wires installed in the seats are operated by power generated by each piezoelectric element during engine operation.

BACKGROUND OF THE INVENTION

Generally, in an automobile, the seats are installed so that the passengers feels safe and comfortable within the limited space of the automobile. Generally, the seats are classified into front seats and rear seats. When in the automobile, passengers directly contact the seats, which may feel cool or warm.

A heater is also generally installed in automobiles for heating a space within the automobile. Often, cooling water heated by the heat of engine is circulated, and a fan driven to blow heat extracted from the water into the automobile. In other words, the external air or internal air is blown into the automobile, extracts heat from the cooling water. The increased temperature air is then discharged through a ventilator for heating the inner space of the automobile.

Such heating apparatuses are very effective for increasing the temperatures within the entire area of the automobile. However, it is often difficult to heat the seats in direct contact with the hip and back of a passenger. In such a case, the passenger typically feels hot on his face, but feels cold on his body portions contacting with the seats.

Furthermore, in the winter season, when an automobile has been parked outside for a long time, and a passenger enters the automobile, the temperature of the inner space of the automobile is relatively low, and the surfaces temperatures of the seats are relatively low. Therefore, when a driver sits on a driver's seat and starts the engine, the driver is often very cold. In this case, the heater often takes a long time to heat up the inner space to a desired temperature at which the driver feels comfortable.

In order to overcome the above problems, apparatuses for heating seats directly have been developed. Typically, some apparatuses use the power of an automobile, and some the engine heat of an automobile.

In addition, in heating apparatuses that use cooling water, it is only possible to heat the seats when the temperature of the cooling water is increased up to a certain degree by the engine after the engine is started. In addition, since the heat from the engine is used, a certain engine loss may occur in the engine. Therefore, the performance and output of the engine may be decreased, thereby reducing the value of the heaters.

SUMMARY OF THE INVENTION

Embodiments of the present invention provide a heating apparatus for automobile seats in which a heating wire is installed in the interiors of the seats, and a piezoelectric element is installed between an automobile engine and each engine mount. The heating wire installed in the interior of the seat is operated by the power generated by each piezoelectric element. Therefore, in the present invention, an additional power source and various sensors are not needed. A simple construction and part may be adapted as compared with the construction that a heating pipe is installed in the interior of the seat. In particular, it is possible to supply heat to the seats without any loss in the power of engine and fuel.

To achieve the above objects, there is provided a heating apparatus for automobile seats, comprising a piezoelectric element disposed between an automobile engine and each engine mount adapted to support the engine; a voltage amplifier that receives a power generated by the piezoelectric element based on an engine vibration and amplifies the power; a heating unit that is installed in the interiors of seats and receives a power from the voltage amplifier, thus heating the seats based on a heating operation; and an on and off switch for connecting and disconnecting the operation power supplied to the heating unit.

In addition, the voltage amplifier includes a circular steel core in which a primary coil is wound on one side of the same, and a secondary coil is wound on the other side. This forms a certain winding ratio with respect to the primary coil, wherein the primary coil of the circular steel core is connected with each piezoelectric element, and the secondary coil is connected with the heating unit of the seat. An induction electromotive force of voltage generated and amplified in the secondary coil by the electromotive force of the primary coil supplied from each piezoelectric element is supplied to the heating unit of the seat.

There is further provided a seating detection switch that is installed in the seat cushion and is turned on and off by a state whether passenger sits on a seat or does not sit, thus connecting and disconnecting the operation power of the heating unit of the seat.

The seating detection switch includes a driving contact point that is elastically supported by a spring; and a fixed contact point that forms an on contact point when the driving contact point is pressed by the weight of the passenger when the passenger sits on the seat.

There is further provided a bimetal switch that is installed between the seat heating unit and the current amplifier, wherein said bimetal switch is automatically turned on and off.

BRIEF DESCRIPTION OF THE DRAWINGS

The aforementioned aspects and other features of the present invention will be explained in the following description, taken in conjunction with the accompanying drawings, wherein.

DETAILED DESCRIPTION OF PREFERRED EMBODIMENTS

Hereinafter, such embodiments of the present invention are described in detail with reference to the accompanying drawings.

The present invention relates to a heating apparatus for automobile seats of a heating wire type. A heating wire is installed in the interior of a seat. The heating wire is operated by power generated using the vibration of an engine. The seats are heated by increasing the temperature of the heating wire that receives the power.

Figure 1A:
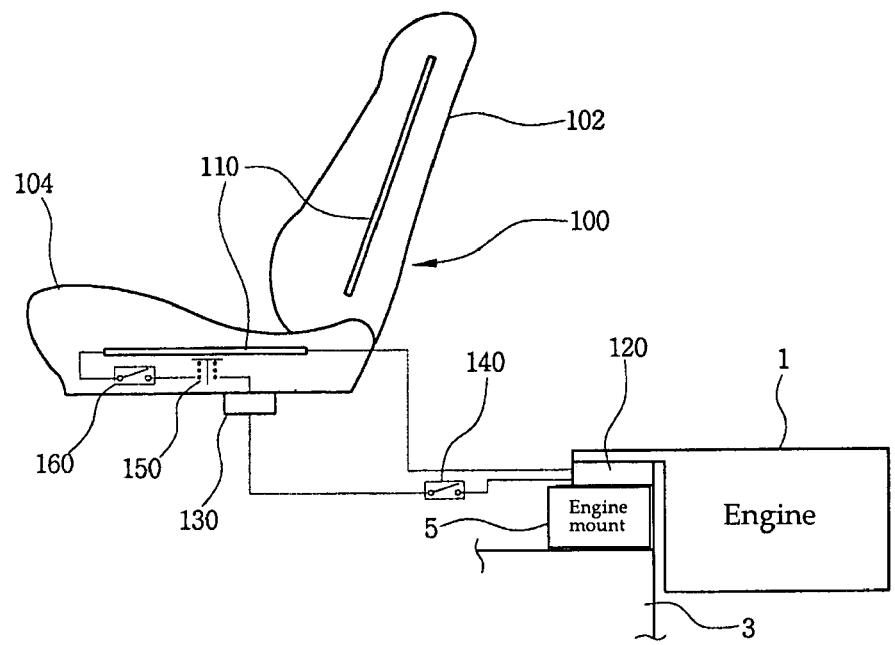
FIGS. 1A and 1B are views illustrating the construction of a heating apparatus for automobile seats according to the present invention.
Figure 1B:
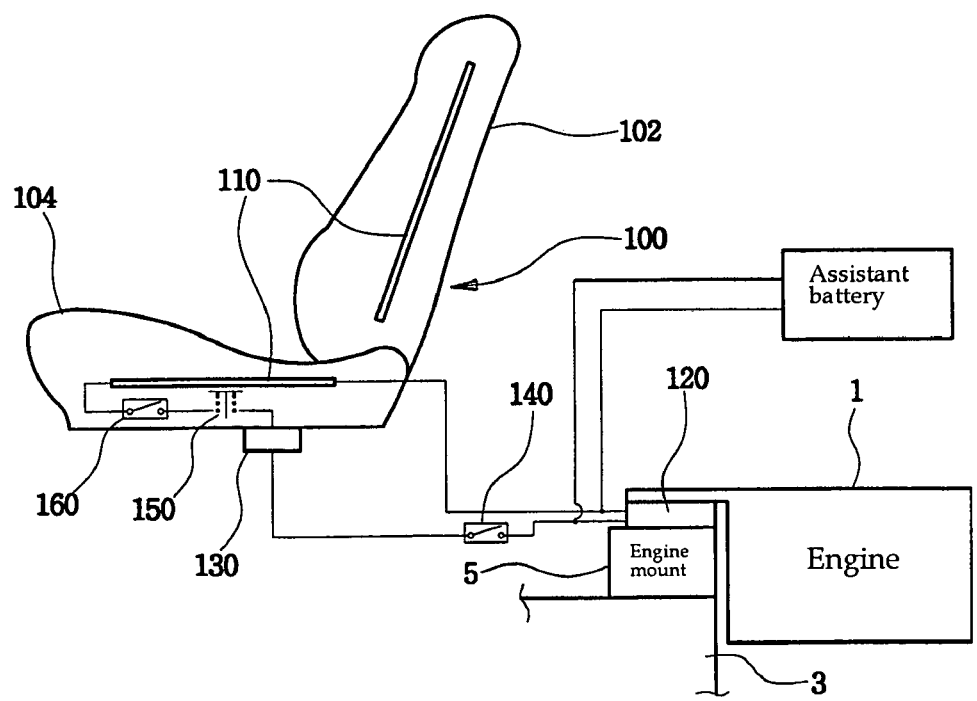
Figure 2:
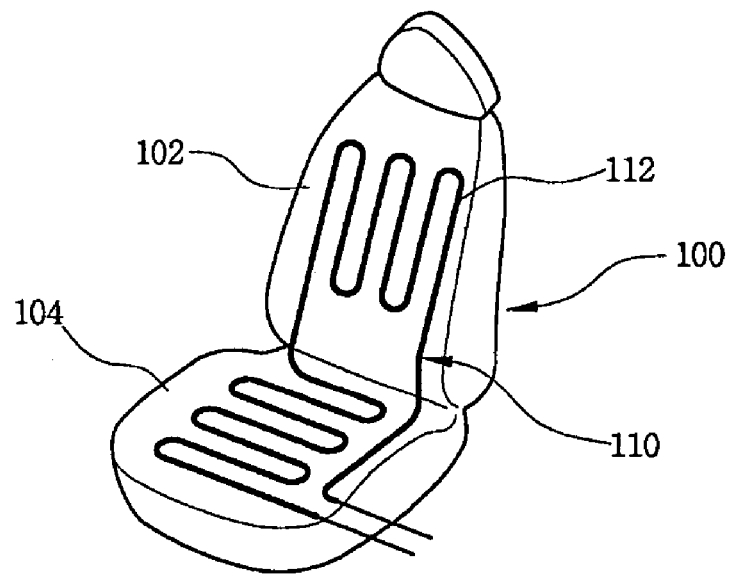
FIG. 2 is a perspective view illustrating installed heating wires in a heating apparatus for automobile seats according to the present invention.

FIGS. 1A and 1B are views illustrating the construction of a heating apparatus for automobile seats according to the present invention. FIG. 2 is a perspective view illustrating installed heating wires in a heating apparatus for automobile seats according to the present invention. A heating unit 110 is installed in the interior of a seat back 102 and a seat cushion 104, such that a seat 100 is heated when power is supplied thereto.

As shown in FIG. 2, the heating unit 110 is constituted in such a manner that a heating coil, namely, a heating wire 112 is uniformly provided at regular intervals in the interior of the seat back 102 and the seat cushion 104. A piezoelectric element 120 is installed between an automobile engine 1 and each engine mount 5 capable of supporting a body 3 of the engine 1 as a power supply unit for operating the heat wire 112. The piezoelectric element 120 is capable of generating power by the vibration of the engine 1. The heating wire 112 of the heating unit 110 receives the power generated by the piezoelectric element 120 during the operation of the engine and is heated, thereby heating the seat 100.

Conventionally, a plurality of engine mounts 5 are installed between the engine 1 and the body 3 for disconnecting or offsetting the transfer force of the engine 1 generated while driving. Preferably, three to five engine mounts 5 are installed. In the present invention, a piezoelectric 120 (piezo ceramic) is installed between the engine 1 and each mount 5, so that power is generated from each piezoelectric element 120 to operate the heating wire 112 when the engine 1 is vibrated.

When the piezoelectric element 120 receives a certain displacement, it generates an electric charge. Such piezoelectric elements 120 are generally used in converters capable of measuring a pressure or stress, or in a weight meter capable of measuring weight. Since ceramic type piezoelectric elements are strong in compression, even when they are installed between the engine 1 and the engine mount 5. There will be no problems of durability. In particular, when it is installed with a certain reference voltage by providing compression when installing the same, it does not receive any tensile force when it receives an upward and downward displacement by the vibration of engine. Suitable piezoelectric elements are those used in a weight meter and in an acceleration meter capable of measuring a few thousands Hz.

As mentioned, the present invention is directed to a heating apparatus for automobile seats that uses a self-generated power of the piezoelectric element 120. Each piezoelectric element 120 converts the natural vibration of the engine into electrical energy. The power generated by the piezoelectric element 120 is supplied to the heating wire 112 installed in the interior of the heating unit of the seat 100 through a certain amplification process. This allows for the heating wire 112 to be heated, thereby heating the seat 100.

In addition, an assist battery is connected to the piezoelectric element. Power of the piezoelectric element generated by the vibration of the engine is charges the assist battery when heating of the seats is not needed. The charged power is then supplied when it is needed. The charge in the assist battery may be supplied to entire-length parts if it is needed.

Figure 3:
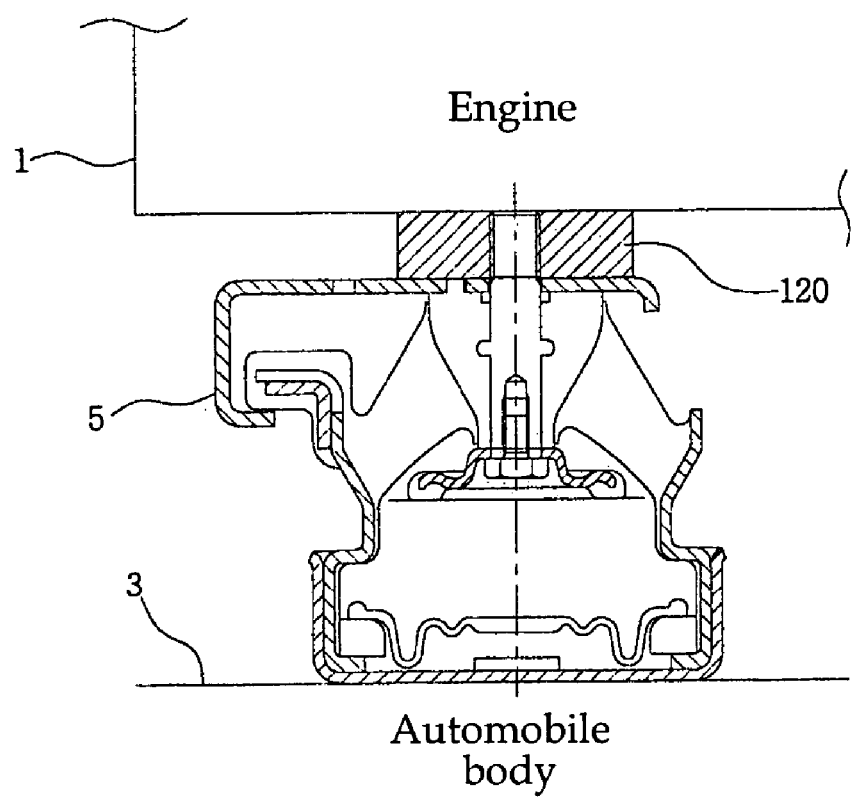
FIG. 3 is a schematic view illustrating an installation state of a piezoelectric element capable of generating power in a heating apparatus for automobile seats according to the present invention.

FIG. 3 is a schematic view illustrating an installed piezoelectric element capable of generating power in a heating apparatus for automobile seats according to the present invention. As shown therein, a circular piezoelectric element 120 is installed between the engine 1 and the engine mount 5. The shape of the piezoelectric element 120 may be changed based on the shape of the engine mount.

Figure 4:
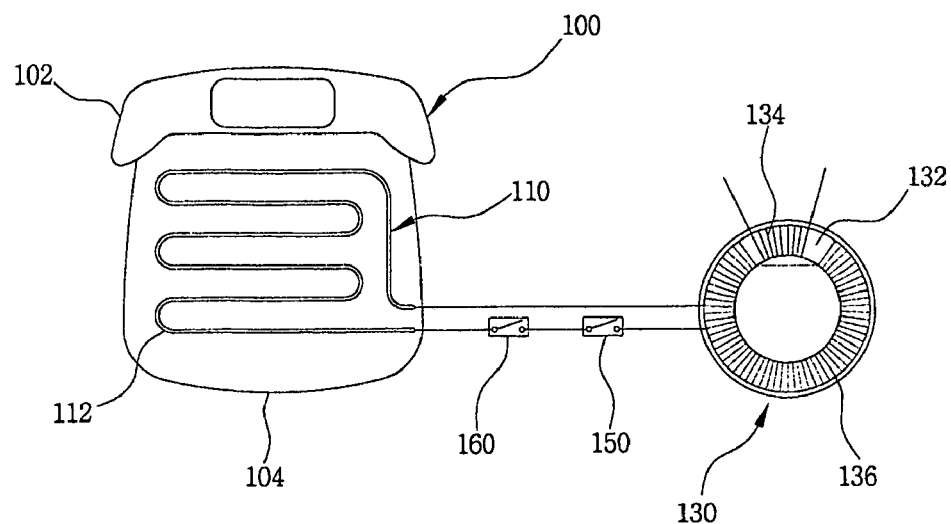
FIG. 4 is a schematic view illustrating the construction of a voltage amplifier in a heating apparatus for automobile seats according to the present invention.

When the engine is started, the piezoelectric element 120 is displaced by the vibration of the engine 1 and generates power. The generated power is amplified by a voltage amplifier 130 and is supplied to the heating wire 112 of the seat heating unit 110. The voltage amplifier 130 is capable of amplifying the voltage generated by the piezoelectric element 120 and transferring the voltage to the heating unit 110 of the seats. The construction of the voltage amplifier 130 is described with reference to FIG. 4.

The voltage amplifier 130 performs an amplification operation based on Faraday rule. When electromotive force generated by the engine is applied at a primary coil 134, an induction electromotive force of the voltage is amplified at the secondary coil 136 based on the number of windings of the primary coil 134 and the secondary coil 136. The electromotive force of the voltage amplified secondary coil 136 is adapted to operate the heating wire 112 of the seat heating unit 110. The voltage amplifying unit 130 of the present invention is constituted in such a manner that the primary coil 134 and the secondary coil 136 are wound on a circular steel core 132 by a certain number of windings. The primary coil 134 connected to the piezoelectric element 120 is wound on one side of the circular steel core 132, and the secondary coil 136 connected with the heating wire 112 of the heating unit 110 is wound on the other side of the circular steel core 132, based on a certain number of windings as compared with the primary coil 134.

In the voltage amplifier 130, when the current generated by the piezoelectric element 120 is supplied to the primary coil 134, an electromotive force of the primary coil 134 forms a magnetic field in the circular steel core 132. The magnetic field is applied to the secondary coil 136 with the same magnetic field. An induction current is applied to the secondary coil 136 by the magnetic field. At this time, the current applied by the ratio of the number of windings of the primary coil 134 and the secondary coil 136 is generated in the secondary coil 136.

The voltage amplifier 130 of the present invention is installed at one side of the seat 100, and the current generated by the secondary coil 136 is applied to the heating wire 112 of the heating unit 110 of the seat through the seating detection switch 150 and the bimetal switch 160. The current generated by the secondary coil 136 of the voltage amplifier 130 is supplied to the heating wire 112 of the heating unit 110 in the seat. This energizes the heating wire 112 to heat the seat 100. Therefore, the heating wire 112 is operated based on the power generated by the natural vibration of the engine 1.

As shown in FIGS. 2A and 2B, the heating apparatus for automobile seats according to the present invention includes an on and off switch 140 manually operated for an on and off operation of the apparatus by the passenger. The on and off switch 140 is a switch installed to selective and manually supply power to the heating wire. As shown in FIGS. 2A and 2B, the on and off switch 140 is installed between the piezoelectric element 120 and the voltage amplifier (primary coil) 130. In another embodiment of the present invention, it may be installed at any location where the power to the heating wire is connected or disconnected by a on and off operation. It may be installed at a location where a driver or passenger can easily control the switch from the seat 100.

The heating apparatus for automobile seats according to the present invention may also include a seating detection switch 150 turned on by the weight of the passenger when he sits on the seat in such a manner that the induction current is supplied to the heating unit 110 in the interior of the seat only when the passenger sits on the seat 100 even when the on and off switch 140 is turned on.

The seating detection switch 150 maintains an off state in a state that passenger is not sitting in the seat. The seating detection switch 150 is preferably installed at a central location of the seat cushion 102 so that it is turned on by the weight of the passenger sitting down on the seat 100. As shown in FIGS. 2A and 2B, it may be installed between the voltage amplifier (secondary coil) 130 and the heating unit 110.

Figure 5:
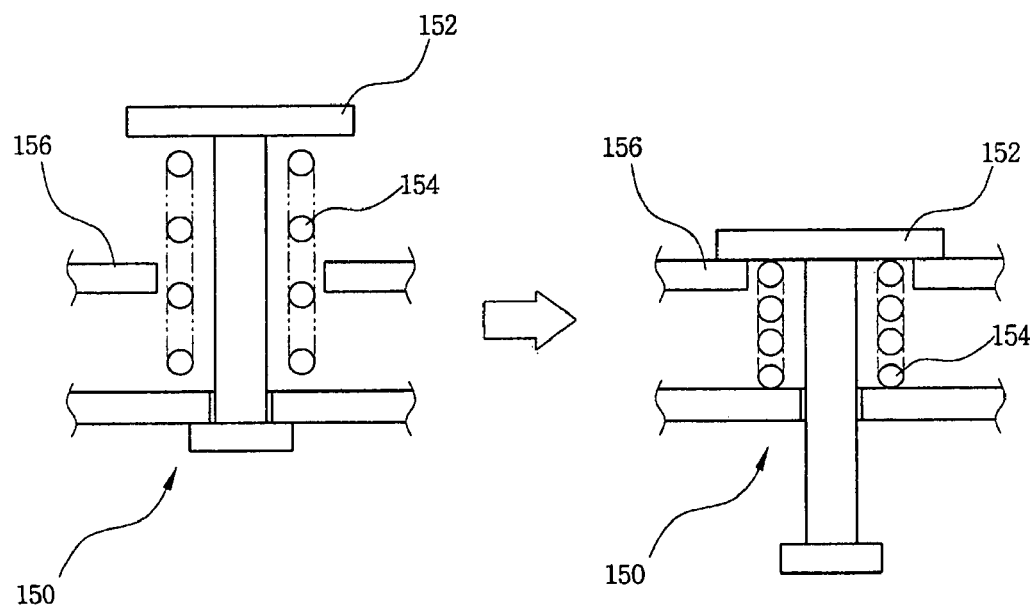
FIG. 5 is a view of an example of a seating detection switch turned on when a person sits in a heating apparatus for automobile seats according to the present invention.

FIG. 5 is a view of an example of a seating detection switch, the construction and operation of which will be described below. The driving contact point 152 forms an on state with the fixed contact point 156 when it is pressed down by the weight of the passenger. The driving contact point 152 is elastically supported by the spring 154. Namely, when a passenger sits on the seat 100, the driving contact point 152 of the seating detection switch 150 provided in the seat cushion 102 overcomes the force of the spring 154, by the force that the weight of the passenger, and is pressed down. The driving contact point 152 contacts the fixed contact point 156 of the lower side, and the switch is turned on. When the seating detection switch 150 is "on", the amplification current provided from the voltage amplifier 130 is supplied to the heating unit 110 of the seat through the switch contact points.

In the heating apparatus for automobile seats including the seating detection switch 150, when a passenger sits on the seat 100, the seating detection switch 150 is turned on, the power is supplied to the heating unit 110 of the seat 100, and heat is generated in the seat 100. When a passenger does not sit on the seat, the power is disconnected, and heat is not generated.

In the heating apparatus for automobile seats according to the present invention, a bimetal switch 160 may be installed for automatically disconnecting the power supply when excessive heat above a predetermined temperature is generated. The bimetal switch 160 is installed between the heating wire 112 of the heating unit 110 and the voltage amplifier 130. In an embodiment of the present invention, the bimetal switch 160 that is automatically turned on and off is installed between the heating wire 112 and the seating detection switch 150.

Figure 6:
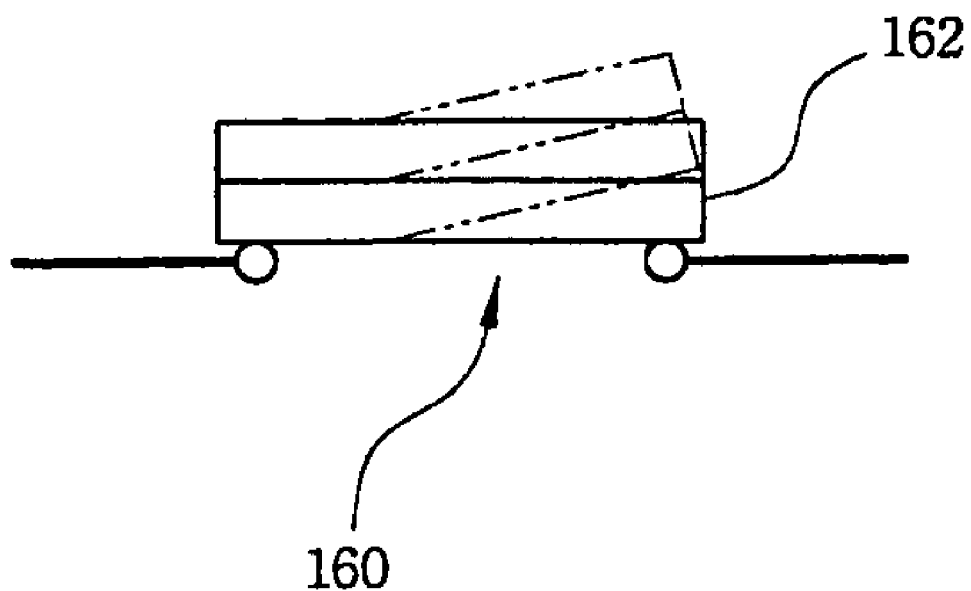
FIG. 6 is a view illustrating an "on" state of a bimetal switch in a heating apparatus for automobile seats according to the present invention.

As shown in FIG. 6, the switch terminal 162 is formed by conjugating two kinds of metals having different thermal transformation ratios. When the switch terminal 162 is connected, when it is transformed by the heat of over temperature, the contact point is disconnected, so that the power is automatically disconnected.

The operation of the heating apparatus for automobile seats according to the present invention will now be described. First, a driver sits on a seat, starts the engine, and operates the on and off switch 140 so that the switch is on. The current generated by the piezoelectric element 120 based on the vibration of an engine is supplied to the primary coil 134 of the voltage amplifier 130. The secondary induction current, amplified based on the number of windings, is generated in the secondary coil 136. The current of the secondary coil 136 is supplied to the heating unit 110 of the interior through the seating detection switch 150 and the bimetal switch 160. The heating wire 112 of the heating unit 110 generates heat and heats the seat 100. Thereafter, the bimetal switch 160 is turned on and off, thus maintaining a desired heat of the seat 100.

As described above, the heating apparatus for automobile seats according to the present invention relates to a seat heating apparatus using self-generated power. A heating wire is installed in the interior of the seat. A piezoelectric element is installed between the automobile engine and each engine mount. The heating wire of the interior of the seat is operated by the power generated by each piezoelectric element when the engine vibrates. The seats are heated by the heating operation of the heating wire that receives power.

Therefore, according to the heating apparatus for automobile seats according to the present invention, an additional power and various sensors are not needed. A simple construction and fewer parts are achieved in the present invention as compared with the conventional construction in which the cooling water pipes are installed in the interior of the seat. Various pipes and valves are not needed for supplying an engine cooling water to the seat. In particular, it is possible to supply heat to the seats without any loss in power and performance of engine.

What is claimed is:

1. A heating apparatus for a seat of an automobile, comprising:
   a piezoelectric element disposed between an automobile engine and each engine mount adapted to support the engine;
   a voltage amplifier that receives power generated by the piezoelectric element based on engine vibration and amplifies the power;
   a heating unit that is installed in an interior of a seat and receives power from the voltage amplifier to heat the seat; and
   an on and off switch for connecting and disconnecting the power supplied to the heating unit.

2. The apparatus of claim 1, wherein said voltage amplifier includes:
   a circular steel core in which a primary coil is wound on a first side thereof, and a secondary coil is wound on a second side thereof, to form a winding ratio with respect to the primary coil, wherein the primary coil of the circular steel core is connected with each piezoelectric element, and the secondary coil is connected with the heating unit of the seat, and an induction electromotive force of voltage generated and amplified in the secondary coil by the electromotive force of an primary coil supplied from each piezoelectric element is supplied to the heating unit of the seat.

3. The apparatus of claim 1, further comprising:
a seating detection switch that is installed in the seat and is turned on by whether a passenger sits on the seat, thereby connecting power to the heating unit.

4. The apparatus of claim 3, wherein said seating detection switch includes:
a driving contact point that is elastically supported by a spring; and
a fixed contact point that contacts with the driving contact point when the driving contact point is pressed by the weight of a passenger sitting on the seat.

5. The apparatus of claim 1, further comprising a bimetal switch that is installed between the seat heating unit and the voltage amplifier, wherein said bimetal switch is automatically turned on and off.

6. The apparatus of claim 1, further comprising an assist battery electrically connected with the piezoelectric element.

* * * * *